United States Patent Office 3,367,158
Patented Feb. 6, 1968

3,367,158
HIGH-POWER WORKPIECE-FORMING METHOD
Hans-Josef Mürtz, Lampertheim, Germany, assignor to Brown, Boveri & Cie Aktiengesellschaft, Mannheim-Käfertal, Germany, a corporation of Germany
Filed Apr. 21, 1965, Ser. No. 449,720
Claims priority, application Germany, Apr. 23, 1964, B 76,467
13 Claims. (Cl. 72—56)

ABSTRACT OF THE DISCLOSURE

High-pressure method of forming workpieces by converting electrical shock discharges into mechanical deformation effects acting upon the workpieces includes transmitting deformation energy simultaneously to different locations of a workpiece by a plurality of different kinds of electrical-to-mechanical shock conversion. Device for carrying out the foregoing method includes electrical shock-current supply means, a plurality of different energy converters adapted to jointly receive a workpiece to be formed and connected to the supply means for simultaneously converting shock current into mechanical deformation effects acting upon the workpiece, one of the energy converters being a mechanical field coil and another of the converters having electrically responsive means for producing a mechanical pressure surge.

---

Figure 1:
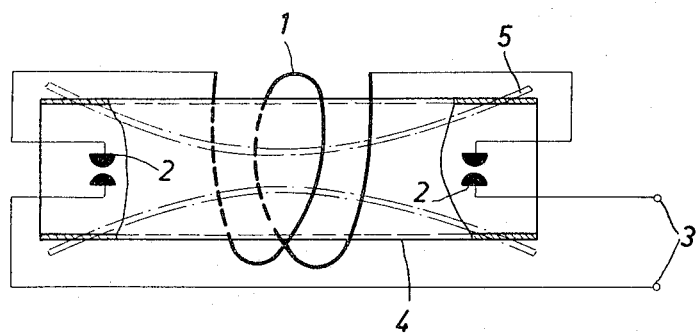

My invention relates to a high-power workpiece-forming method.

There are known methods of this type, according to which an electric shock discharge from an electrical energy storer, for example a capacitor battery, is passed on to an energy converter which exerts a mechanical effect upon the workpieces. Examples of energy converters that have been used for these purposes are magnetic field coils and spark gaps operating preferably in water, as well as vaporizable wires. The different kinds of energy converters have varying suitability for respectively different forming purposes. For example, cylindrical magnetic field coils are particularly well suited for producing constrictions in tubular workpieces shoved into the coils. On the other hand, tubular workpieces, for example, can be given a bulge-shaped deformation in a particularly simple manner with the aid of wires extending within the tubular workpiece. The under-water spark gap device is employed to advantage if the converted energy is to be concentrated in a small space, for example in connection with stamping or punch-press problems and the like.

Some workpiece-forming problems, particularly those involving complicated shapes, make it desirable to employ several of these methods for respective partial deformation of the workpiece. In accordance with the techniques heretofore used, this method requires applying different kinds of apparatus, or at least adapting an apparatus performing one operation so that it can perform a second and different operation.

It is an object of my invention to simplify such workpiece-forming methods and to reduce the amount of time required for imparting the desired shape to them by high-power deformation generally in accordance with the principle mentioned above.

The invention is based upon the recognition that it is possible to transmit simultaneously to the workpiece the deformation energies corresponding to the respectively different methods. Preferably, the energy required for deformation of the workpiece is transmitted simultaneously to the workpiece by a magnetic field and by a shock wave acting mechanically with the aid of a pressure medium. Such a mechanical shock wave may be produced electrically by a spark discharge or a vaporizable wire. If, for example, a forming problem to be solved resides in constricting a cylindrical tube in the middle and widening the tube at the ends, the method according to the present invention may be performed by slipping a magnetic field coil over the middle portion of the tube and disposing two spark gap devices in the tube near the respective tube ends.

According to another, more specific, feature of my invention, magnetic field coils and spark-gap devices are jointly connected in series or in parallel to an electrical energy storer. This renders the necessary processing equipment relatively inexpensive and provides for most economical utilization.

The method according to the invention further affords a number of other advantages in comparison with the above-mentioned known forming methods. In series-type or assembly-line production, the conversion periods ordinarily necessary for adapting the equipment from one to another method step are obviated because all of the method steps required for the forming operations take place simultaneously. Furthermore, inadvertent effects of the magnetic fields upon workpiece portions which heretofore had to be deformed in a second method step, can be made ineffective by the simultaneous action of the mechanical shock wave. Complicated tools or jigs which heretofore were required for securely holding the workpiece at those regions in which no action of a forming step was to take place, can be dispensed with. Even workpieces of complicated shape, if no particularly exacting requirements are placed upon dimensions, can be produced by the method according to the invention without any use of matrices or die blocks, it being only necessary to provide for a suitable construction and arrangement of the different energy converting means.

According to another feature of the invention, the mechanical shock wave may also be produced by a blasting composition, in lieu of using a spark-gap discharge, the blasting composition being employed in addition to, and simultaneously with, the magnetic field coil. The blasting composition is ignited simultaneously with the shock discharge of electrical energy. It may be placed, for example, in the form of explosive foils upon the portions of the workpiece to be deformed by the shock wave. With a suitable shaping of workpiece and foil, the blasting composition is ignited only by the jarring caused in the workpiece by the mechanical shock discharge. In other cases, the ignition may be effected by an igniter, for example an auxiliary spark released simultaneously with the shock discharge.

According to still another feature of the invention, the deforming energy is transmitted to the workpiece by an electrical spark gap or a vaporizable wire and simultaneously by a blasting composition or member ignited by the same spark discharge.

The invention will be further described with reference to the accompanying drawing showing schematically and by way of example two different embodiments of equipment for performing the method according to the invention.

Figure 2:
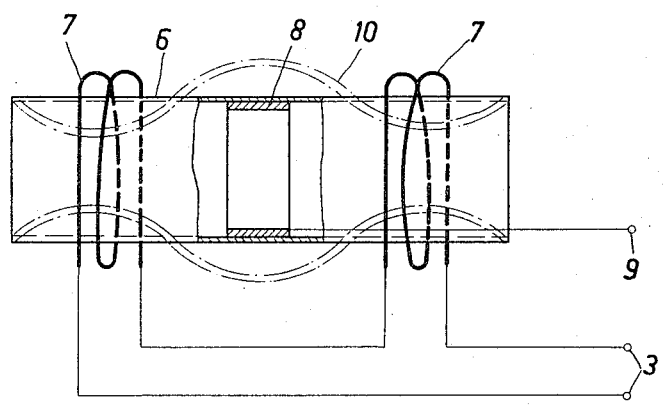

FIG. 1 shows diagrammatically the simultaneous use of three energy converters for acting upon a tubular workpiece shown partly in section; and FIG. 2 shows the combined application of magnetic deformation and the generation of a shock wave by a blasting member, both acting upon a tubular workpiece shown partly in section.

In FIG. 1, one of the energy converters is constituted by a magnetic field coil 1 and the two additional energy converters are constituted by respective spark gaps 2 between pairs of electrodes. All of the three energy converters are connected electrically in series between two terminals 3 which are in turn connected, for energizing the converters, to an electrical energy storer such as a battery of capacitors (not illustrated). The workpiece to be deformed is a tube 4 of metal which is to be given a constriction in its middle portion and widened at both end portions thereof. The ultimately deformed shape of the tubular workpiece is shown in broken lines and denoted by 5. For satisfying particularly exacting requirements with respect to accuracy of ultimate measurements, corresponding matrices may be placed into the middle portion of the tube or may be given a ring-shaped configuration and placed about the tube, thus limiting the deformation of the tube to the precise measurements desired. However, if the widened end portions of the workpiece serve only for joining the tube with respective other tubes (not shown) which are previously shoved upon the tube 4 in overlapping relation thereto, then no auxiliary means such as matrices are required at these localities.

In accordance with another feature of the invention, two different electric energy converters may also be combined to a single converter. For this purpose, the magnetic field coil is made of thin wire so that it will evaporate when subjected to the electric shock or surge discharge and thus act simultaneously as a generator of a mechanical shock wave to be transmitted onto the workpiece through water or a similar pressure transmitting medium. Such a magnetic field coil of thin wire, if used alone, would not possess adequate stability with respect to the reactive forces which the workpiece imposes upon the coil. For that reason, and in accordance with a further feature of the invention, the thin-wire coil is surrounded with some clearance by a rigid conductor surface exhibiting similar reactive forces upon the coil as the workpiece, but in the opposite direction. The rigid abutment surface of the surrounding conductor thus prevents the magnetic migration or deflection of the wire and also the formation of a discharge channel at the locality of the wire. Simultaneously the rigid conductor surface may be constructed to act as a reflector surface for the mechanical shock wave for concentrating the shock wave onto the regions of the workpiece not located in the full action range of the magnetic field. This is particularly advantageous if the workpiece has relatively deep undercuts or shoulders and thus has a shape which in many cases cannot be formed by the above-mentioned conventional methods, and whose formation by purely magnetic means involves difficulties.

FIG. 2 shows the combined application of the magnetic forming principle in conjunction with the generation of a shock wave by a blasting set or composition for the purpose of producing an outward bulge in the middle portion of the tubular workpiece 6 and constricted portions near the respective ends of the workpiece. The end portions to be given a constriction are surrounded by respective magnetic field coils 7. These are connected in series between terminals 3 which are to be attached to an electrical energy storer. The blasting composition is constituted by an annular foil or a thin tubular piece 8 which is shoved into the middle portion 8 of the tube 6. If an electrical surge is passed through the coils 7, the pressure due to the resulting contraction of the tube 6 at the respective localities of the coils 7 causes the annular blasting piece 8 to be ignited and to effect bulging of the tube in the middle portion. If desired, the ignition of the blasting piece 8 may also be effected with the aid of a connecting wire attached to a terminal 9 which is to be energized electrically in synchronism with the shock discharge applied to the terminals 3. The deformed condition of the tube 6 is shown at 10 by broken lines.

Relative to structural details and power requirements, reference may be had to D. F. Brower, "Magnetic-Pulse Forming," published by Society of Automotive Engineers, Inc., 485 Lexington Avenue, New York 17, N.Y. (Paper 479 B) and also to the reference literature mentioned by Brower.

I claim:
1. The high-pressure method of forming workpieces by converting electrical shock discharges into mechanical deformation effects acting upon the workpieces, which comprises transmitting deformation energy simultaneously to different locations of the workpiece by a plurality of different kinds of electrical-to-mechanical shock conversion.

2. The high-pressure method of forming workpieces by converting electrical shock discharges into mechanical deformation effects acting upon the workpieces, which comprises subjecting the workpiece at a given location thereof to an electromagnetic field to thereby deform the workpiece at that given location in response to said electrical shock discharges, and simultaneously imparting through a pressure transmitting medium a mechanically deforming shock wave to the workpiece at another location thereof.

3. The workpiece forming method according to claim 2, which comprises electrically producing said mechanically deforming shock wave by a spark discharge in said medium.

4. The workpiece forming method according to claim 2, which comprises producing said mechanically deforming shock wave by electrically vaporizing a wire in said medium.

5. A workpiece forming method according to claim 2, which comprises producing said mechanically deforming shock wave by exploding a blasting member.

6. The workpiece forming method according to claim 2, which comprises producing said mechanically deforming shock wave by an electric discharge in said medium and simultaneously by causing said latter dscharge to ignite a blasting member.

7. Device for the pressure-forming of workpieces by converting electrical shock discharges into mechanical deformation effects, comprising electrical shock-current supply means, a plurality of different energy converters adapted to jointly receive a workpiece to be deformed and connected to said supply means for simultaneously converting shock current into mechanical deformation effects acting upon the workpiece, one of said energy converters being a magnetic field coil; and another one of said converters having electrically responsive means for producing a mechanical pressure surge.

8. In a forming device according to claim 7, said energizing converters being electrically connected in series with each other.

9. In a forming device according to claim 7, said electrically responsive means of said other converter comprising a spark gap.

10. In a forming device according to claim 7, said electrically responsive means of said other converter comprising a vaporizable member.

11. Device for the pressure-forming of workpieces by converting electrical shock discharges into mechanical deformation effects, comprising electrical shock-current supply means, and a magnetic field coil connected to said supply means to electromagnetically deform the workpiece, said coil consisting of wire vaporizable by the shock current of said supply means to simultaneously produce a workpiece-deforming mechanical shock wave.

12. A forming device according to claim 11, comprising a rigid conductor member having a surface normally surrounding said field coil with clearance for limiting reactive displacement of said coil.

13. A forming device according to claim 9, comprising reflector surface means for concentrating upon the workpiece the mechanical shock wave issuing from said spark gap.

References Cited

UNITED STATES PATENTS

| | | | |
|---|---|---|---|
| 3,181,328 | 5/1965 | Zeitlin | 72—56 |
| 3,208,254 | 9/1965 | Inoue | 72—56 |
| 3,228,221 | 1/1966 | Zernow et al. | 72—56 |
| 3,279,228 | 10/1966 | Brower | 72—56 |

RICHARD J. HERBST, *Primary Examiner.*